(12) United States Patent
Kwon et al.

(10) Patent No.: US 11,949,445 B2
(45) Date of Patent: Apr. 2, 2024

(54) PROTECTIVE CASE HAVING CARD STORAGES FOR PORTABLE ELECTRONIC DEVICE

(71) Applicant: SPIGEN KOREA CO., LTD., Seoul (KR)

(72) Inventors: Young Hee Kwon, Seoul (KR); Gang Il Park, Seoul (KR); Tae Sung Yoon, Seoul (KR); Tae Heon Kim, Seoul (KR)

(73) Assignee: SPIGEN KOREA CO., LTD., Seoul (KR)

(*) Notice: Subject to any disclaimer, the term of this patent is extended or adjusted under 35 U.S.C. 154(b) by 0 days.

(21) Appl. No.: 17/900,811

(22) Filed: Aug. 31, 2022

(65) Prior Publication Data
US 2023/0060933 A1 Mar. 2, 2023

(30) Foreign Application Priority Data
Aug. 31, 2021 (KR) .................. 10-2021-0115873

(51) Int. Cl.
*H04B 1/3888* (2015.01)
*G06F 1/16* (2006.01)
(52) U.S. Cl.
CPC ......... *H04B 1/3888* (2013.01); *G06F 1/1611* (2013.01); *G06F 1/1626* (2013.01)
(58) Field of Classification Search
CPC ....... H04B 1/3888; H04B 1/03; G06F 1/1611; G06F 1/1626; G06F 1/1632; G06F 2200/1633; A45C 11/00; A45C 11/182; A45C 13/008; A45C 13/02; A45C 1/06; A45C 2011/002; A45C 2011/003; A45D 33/26
See application file for complete search history.

(56) References Cited

U.S. PATENT DOCUMENTS

| | | | |
|---|---|---|---|
| 9,241,551 B2* | 1/2016 | Lawson | A45C 13/02 |
| 2018/0140066 A1* | 5/2018 | Talarico | A45C 11/182 |
| 2019/0298024 A1* | 10/2019 | Gandhi | A45C 11/00 |
| 2020/0214411 A1* | 7/2020 | Del Moral | A45C 1/06 |

FOREIGN PATENT DOCUMENTS

| | | |
|---|---|---|
| KR | 10-2014-0130201 A | 11/2014 |
| KR | 10-1794879 B1 | 11/2017 |
| KR | 20-2018-0001459 U | 5/2018 |

* cited by examiner

*Primary Examiner* — Yuwen Pan
*Assistant Examiner* — Fatuma G Sherif
(74) *Attorney, Agent, or Firm* — Bridgeway IP Law Group, PLLC; Jihun Kim

(57) ABSTRACT

A protective case configured to cover a portable electronic device is provided. The protective case may include a first card storage configured to receive a first card, and a second card storage configured to store a second card where the second card storage is spaced apart from the first card storage.

3 Claims, 13 Drawing Sheets

PROTECTIVE CASE HAVING CARD STORAGES FOR PORTABLE ELECTRONIC DEVICE

FIELD OF THE INVENTION

The present invention relates to a protective case, which has card storages, for a portable electronic device. More particularly, two openings are respectively formed on top and bottom of the back of the protective case for a portable electronic device such that two cards can be conveniently received respectively through the top and bottom openings and retained therein. The two cards can be conveniently inserted or removed respectively through the top and bottom openings without interfering with each other.

BACKGROUND OF THE INVENTION

Generally, in order to protect a mobile phone from damages resulting from an impact such as a drop, a protective case, made of silicone, plastic or the like, is used and installed on the mobile phone such that the exterior of the mobile phone is covered with the protective case, except its display.

Conventional mobile phone cases have bumpers formed on each corner of the cases to absorb the shock to the corners of a mobile phone or a card storage formed and integrated in the back of the cases in order to carry a card received in the card storage without the need to additionally carry a wallet for the card.

However, conventional mobile phone cases having a card storage only allow one card to be stored. Even when two cards are allowed, the two cards are stacked together and scraped against each other and may be damaged. Additionally, when the two cards are stacked together and stored in the card storage of the case, it is inconvenient to take out the bottom card because the top card should be taken out first.

Therefore, to solve these problems, there is a growing need for a protective case which has two openings formed on top and bottom of the back of the protective case to receive each of two cards where the two cards are slidably received in a double rail structure of two slide grooves. Accordingly, each card can be taken out independently without the need to take out the other card first, and such protective case can prevent damage to the cards or mobile phone.

SUMMARY OF THE INVENTION

Technical Problems

The present invention contrives to solve the above problems. The present invention provides a protective case having card storages for a portable electronic device, which has a double rail structure of two card storages to receive each of two cards. The intended card can be conveniently taken out without the need to take out the other card first.

Another object of the present invention is to provide a protective case having card storages for a portable electronic device, which has two openings respectively formed on top and bottom of the back of the protective case. Each of the two cards can be conveniently inserted into or removed from one of the two openings, and the usability of the protective case in storing cards has been enhanced.

Still another object of the present invention is to provide a protective case having card storages for a portable electronic device, which has a holding tab formed on the card storage to prevent the card from being dislodged through the opening.

Still another object of the present invention is to provide a protective case having card storages for a portable electronic device, which has a recess and a slope for easy insertion and removal of the card. The recess is formed in the area where a user's finger is accessed for removal of the card, and the slope removes or minimizes a bend of the card during the insertion or removal of the card.

Still another object of the present invention is to provide a protective case having card storages for a portable electronic device, which has a stopper to prop and securely retain the card within the card storage area.

The present invention is not intended to be limited to any particular technical problem stated above, and other technical problems, which are not mentioned, will become clearly understood by the following descriptions to those of ordinary skill in the art.

Solution to Problems

A protective case, configured to cover a portable electronic device according to an embodiment of the present invention to solve the above technical problems, includes: a first card storage configured to store a first card; and a second card storage configured to store a second card. The first and second card storages are spaced apart from each other.

In addition, the first card storage may include a first storage slide groove such that the first card slides along and couples to the first storage slide groove.

In addition, the second card storage may include a second storage slide groove such that the second card slides along and couples to the second storage slide groove. The second storage slide groove is provided near the first storage slide groove.

In addition, the first card storage may further include a first spacer protrusion provided between the first storage slide groove and the second storage slide groove to form a separating space.

In addition, the protective case may further include a card cover configured to at least partially cover the first card storage.

In addition, the first card storage may includes a first opening formed on at least a part of the first card storage such that the first card is inserted or removed through the first opening, and the second storage may include a second opening formed on at least part of the second card storage such that the second card is inserted or removed through the second opening. The first opening and the second opening are connected to each other by a space covered by the card cover to form an integrated single space.

In addition, the first card storage may include a first stopper to prop the first card stored in the first storage.

In addition, the first card storage may include a first holding tab to prevent the first card stored in the first card storage from being dislodged to the outside.

In addition, the first card storage may include a first recess formed on one side of the first card storage and depressed in a direction of the one side of the first card storage.

In addition, the first card storage may further include a first slope provided on both sides of the first recess and formed by a slanted surface.

Advantageous Effects of the Invention

According to an embodiment of the protective case having card storages for a portable electronic device in the present invention, the double rail structure allows separate storage of the two cards so that an intended card can be conveniently taken out of the protective case independently of the other card.

In addition, according to an embodiment of the protective case having card storages for a portable electronic device in the present invention, two openings are respectively formed on top and bottom of the back of the protective case, and thus, each of the two cards can be conveniently inserted into or removed from one of the two openings and the usability of the protective case in storing cards has been enhanced.

In addition, according to an embodiment of the protective case having card storages for a portable electronic device in the present invention, a holding tab is formed on the card storage to prevent the card from being dislodged through the opening.

In addition, according to an embodiment of the protective case having card storages for a portable electronic device in the present invention, a recess is formed in the area where a user's finger is accessed for removal of the card, and a slope is formed for easy insertion and removal of the card. The slope removes or minimizes a bend of the card during the insertion or removal of the card.

In addition, according to an embodiment of the protective case having card storages for a portable electronic device in the present invention, the protective case includes a stopper to prop and securely retain the card within the card storage area.

BRIEF DESCRIPTION OF THE DRAWINGS

These and other features, aspects and advantages of the present invention will become better understood with reference to the accompanying drawings, wherein.

DETAILED DESCRIPTION OF EMBODIMENTS OF THE INVENTION

Figure 1:
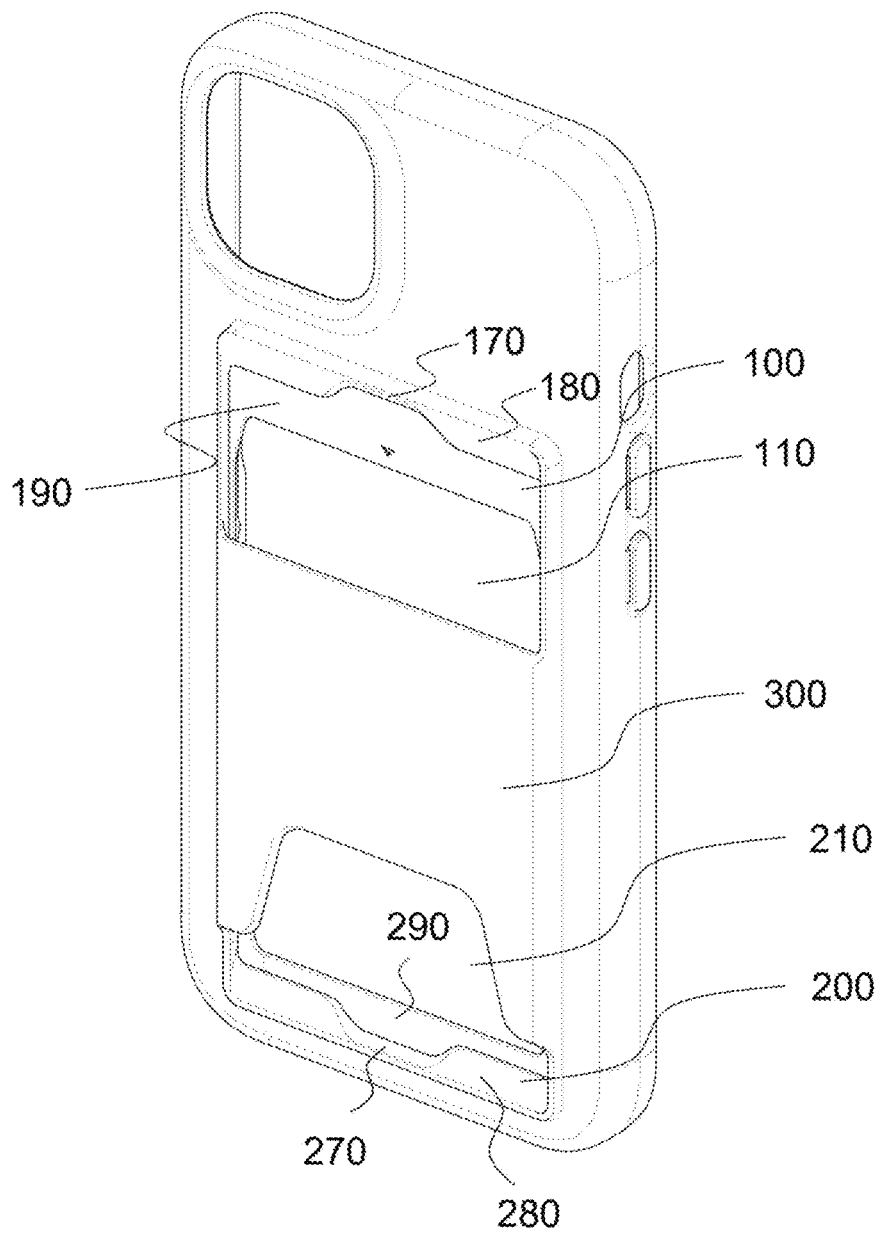
FIG. 1 shows a perspective view of the protective case (10) to explain the protective case (10) according to an embodiment of the present invention.

Hereinafter, embodiments according to the present invention will be described with reference to the accompanying drawings. In adding reference numerals to the components of each drawing, it should be noted that the same components are given the same reference numerals as much as possible even though they are indicated on different drawings. In addition, in describing the embodiments of the present invention, if a detailed description of related known configurations or functions is determined to hinder the understanding of the embodiment of the present invention, the detailed description may be omitted. In addition, embodiments of the present invention will be described below, but the present disclosure is not limited to the described embodiments and the present disclosure may be changed and modified in various ways by those skilled in the art without departing from the spirit and scope of the present disclosure.

Throughout the specification, when a part is described to be "connected" with another part, this includes not only the case of being "directly connected" but also the case of being "indirectly connected" with another element interposed between them. Throughout the specification, when a part is described to "include" a certain element, it does not mean to exclude other element(s), but does mean that additional element(s) may be further included, unless specifically stated otherwise. In addition, in describing the components of the embodiment of the present invention, terms such as first, second, A, B, (a), (b), etc. may be used. These terms are only used to distinguish one component from another, and the substance, order, or sequence of the components are not limited by the terms.

FIG. 1 is a perspective view of the protective case (10) to explain the protective case (10) according to an embodiment of the present invention.

Figure 2:
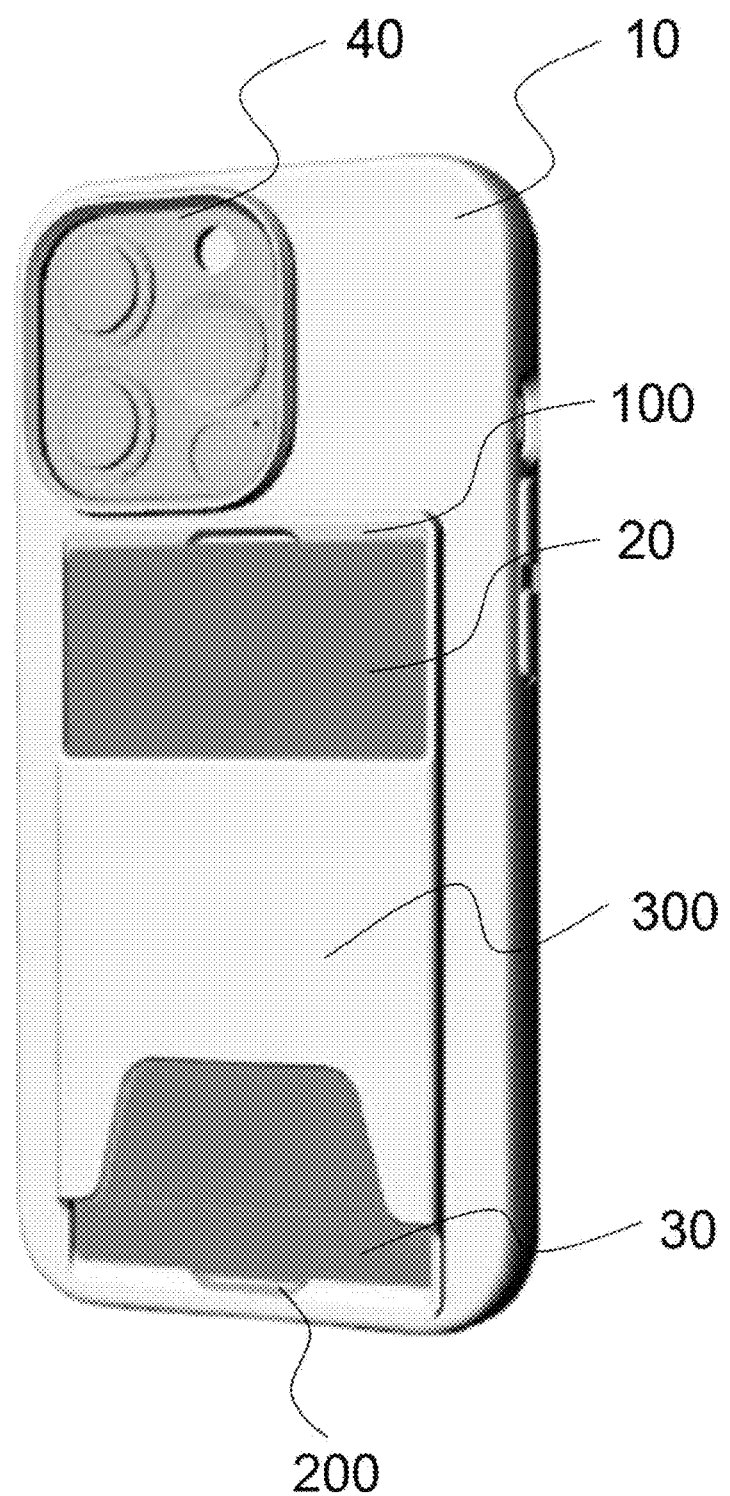
FIG. 2 shows an exemplary view of the protective case (10) to show the first card (20) and the second card (30) stored in the protective case (10) according to an embodiment of the present invention.

According to an embodiment of the present invention, the protective case (10) is configured to cover a portable electronic device (40, see FIG. 2). For reference, the portable electronic device (40) includes a mobile device referred to by various names such as a mobile phone, a cell phone, a cellular phone, etc. and may have various shapes depending on a brand, model, product item, etc. The protective case (10) according to an embodiment of the present invention may be applied to any portable electronic device (40) that may have various shapes.

According to an embodiment of the present invention, the protective case (10) may be configured to at least partially cover the exterior of the portable electronic device (40), except its display, and the shape of the protective case (10) may also be variously configured corresponding to various portable electronic devices' shapes and detailed configurations, such as buttons, cameras, and the likes.

As an example, as shown in FIG. 1, the protective case (10) according to an embodiment of the present invention may include a rectangular shape where the vertical length is longer than the horizontal length, and the protective case (10) may have a thickness to receive the portable electronic device (40) therein.

According to an embodiment of the present invention, the protective case (10) may include a first card storage (100) configured to store the first card (20, see FIG. 2). In addition, the protective case (10) according to an embodiment of the present invention may include a second card storage (200) configured to store a second card (30, see FIG. 2) such that the second card storage (200) is spaced apart from the first card storage (100).

According to an embodiment of the present invention, the first card storage (100) and the second card storage (200) may be provided in the back of the protective case (10) which covers the rear side of the portable electronic device (40). In addition, according to an embodiment of the present invention, the first card storage (100) and the second card storage (200) are spaced apart from each other so that the first card (20) and the second card (30) can be stored to be spaced apart from each other by a predetermined distance.

For reference, throughout the specification, the first card storage (100) and the second card storage (200) according to an embodiment of the present invention are described as being spaced apart from each other so that the first card (20) and the second card (30) can be spaced apart from each other without coming into contact with each other. However, the disclosure is not limited to all the detailed elements of the first card storage (100) and the second card storage (200) being spaced apart, but may further include varied configurations depending on constructions.

According to an embodiment of the present invention, the first card storage (100) covers the area to store the first card (20) and may be configured to insert or remove the first card (20) and securely retain the first card (20) therein. According to an embodiment of the present invention, the first card storage (100) may include a first opening (110), a first storage slide groove (120, see FIG. 4), a first stopper (130, see FIG. 11), a first spacer protrusion (140, see FIG. 5A), a first holding tab (160, see FIG. 11), a first recess (170), a first slope (180), a first bottom surface (190), etc.

Likewise, according to an embodiment of the present invention, the second card storage (200) covers the area to store the second card (30) and may be configured to insert or remove the second card (30) and securely retain the second card (30) therein. According to an embodiment of the present invention, the second card storage (200) may include a second opening (210), a second storage slide groove (220, see FIG. 4), a second stopper (230, see FIG. 13), a second spacer protrusion (240, see FIG. 5B), a second holding tab (260, see FIG. 9), a second recess (270), a second slope (280), a second bottom surface (290, see FIG. 10), etc.

According to an embodiment of the present invention, the first card storage (100) may include a first opening (110) formed on at least part of the first card storage (100) such that the first card (20) is inserted or removed through the first opening (110). According to an embodiment of the present invention, the first card storage (100) may be formed on an upper part of the area to receive the first card (20). Furthermore, according to an embodiment of the present invention, the first card storage (100) may be formed between an upper part of the back of the protective case (10) to cover the portable electronic device (40) and the card cover (300).

Furthermore, according to an embodiment of the present invention, the second card storage (200) may include a second opening (210) formed on at least part of the second card storage (200) such that the second card (30) is inserted or removed through the second opening (210). According to an embodiment of the present invention, the second card storage (200) may be formed on a lower part of the area to receive the second card (30). Furthermore, according to an embodiment of the present invention, the second card storage (200) may be formed between a lower part of the back of the protective case (10) to cover the portable electronic device (40) and the card cover (300).

According to an embodiment of the present invention, the first opening (110) and the second opening (210) may be connected with each other by a space covered by the card cover (300) to form an integrated single space.

More specifically, according to an embodiment of the present invention, the first and second card storages (100, 200) may include an integrated space of a rectangular card storage area corresponding to the rectangular shapes of the cards. The middle part and at least part of the lower part of the card storage area are covered by the card cover (300). Excluding the parts covered by the card cover (300), the first opening (110) is formed on the upper part of the card storage area and the second opening (210) is formed on the remaining lower part of the card storage area.

In other words, according to an embodiment of the present invention, the first opening (110) and the second opening (210) may form a vertically integrated space where the first opening (110) and the second opening (210) are connected to each other in lateral or vertical direction of the protective case (10) to form a single space covered by the card cover (300). The integrated single space forms the rectangular card storage area to store the first and second cards (20, 30).

According to an embodiment of the present invention, the protective case (10) may include a card cover (300) configured to at least partially cover the first card storage (100) and/or the second card storage (200).

More specifically, according to an embodiment of the present invention, the card cover (300) may be configured to cover the middle part of the rectangular card storage area of the first and second card storages (100, 200). According to an embodiment of the present invention, the card cover (300) may be configured to protrude by a predetermined height in the thickness direction of the protective case (10) beyond the first and second card storages (100, 200) of the card storage area.

According to an embodiment of the present invention, the card cover (300) covers the middle part of the card storage area of the first and second card storages (100, 200) in order to prevent the first card (20) and the second card (30) from being damaged by a friction with the outside. Furthermore, the card cover (300) spatially separates the first opening (110) and the second opening (210) to facilitate upward removal of the first card (20) and downward removal of the second card (30).

In addition, according to an embodiment of the present invention, the card cover (300) may cover at least part of the lower part of the card storage area. More specifically, according to an embodiment of the present invention, the card cover (300) not only covers the middle part of the card storage area, but also downwardly extends on both sides by a predetermined length in order to at least partially cover both sides of the lower part of the card storage area.

According to an embodiment of the present invention, a first stopper (130, see FIG. 11) may be formed on the bottom end of the downwardly extended part of the card cover (300) which is extended by the predetermined length. A detailed configuration of the first stopper (130) according to an embodiment of the present invention will be described below in more detail with reference to FIGS. 11 and 12.

According to an additional embodiment of the present invention, the card cover (300) may be configured to cover the entire card storage area, and a button may be provided to slidably move the first and second cards (20, 30) stored in at least part of the card cover (300) so that the first and second cards (20, 30) can be conveniently removed from the protective case (10).

According to an embodiment of the present invention, the first card storage (100) may include a first recess (170) formed on one side of the first card storage (100) and depressed in a direction of the one side of the first card storage (100). In addition, according to the embodiment of the present invention, the first card storage (100) may further include a first slope (180) provided on both sides of the first recess (170) to form a slanted surface.

Similarly, the second card storage (200) according to an embodiment of the present invention may include a second recess (270) and a second slope (280).

The detailed configuration of the first and second recesses (170, 270) and the first and second slopes (180, 280) according to an embodiment of the present invention will be described in more detail below referring to FIGS. 10 and 13.

FIG. 2 shows an exemplary view of the protective case (10) to show the first card (20) and the second card (30) stored in the protective case (10) according to an embodiment of the present invention.

As illustrated and shown in FIG. 2, the protective case (10) according to the embodiment of the present invention may be configured to cover the back and side of the portable electronic device (40), except the display of the portable electronic device (40). In addition, the protective case (10) according to an embodiment of the present invention may be provided with a cover area corresponding to a button provided on the side of the portable electronic device (40), and an exposed area corresponding to the camera unit provided on the back of the portable electronic device (40).

According to an embodiment of the present invention, the protective case (10) may include a first card storage (100) configured to store a first card (20) and a second card storage (200) configured to store a second card (30) where the second card storage (200) is spaced apart from the first card storage (100). In addition, the protective case (10) according to an embodiment of the present invention may include a card cover (300) configured to at least partially cover the first and second card storages (100, 200) where the card cover (300) covers the middle part of the first and second card storages (100, 200) and at least part of both sides of the lower part of the first and second card storages (100, 200).

According to an embodiment of the present invention, the protective case (10) may be configured such that the first card (20) is downwardly inserted through the first opening (110) to be stored in the first card storage (100), and the second card (30) is upwardly inserted through the second opening (210) to be stored in the second card storage (200).

As shown in FIG. 2, the first card (20), the second card (30), and the portable electronic device (40) are respectively illustrated in red, yellow, and blue for better understanding of the configuration of the protective case (10) which covers the portable electronic device (40) and stores the first card (20) and the second card (30).

The protective case (10) according to an embodiment of the present invention is provided with a first card storage (100) and a second card storage (200) to store a total of two cards, namely, the first and second cards (20, 30). In addition, for the protective case (10) according to an embodiment of the present invention, the first card storage (100) and the second card storage (200) are spaced apart from each other, and more specifically, they (100, 200) are configured for the first card (20) and the second card (30), when stored, to be spaced apart from each other by a predetermined distance in the thickness direction.

In addition, the protective case (10) according to an embodiment of the present invention may be configured such that the lower part of the second card (30) is at least partially exposed to the outside when the second card (30) is stored at more inner side of the protective case (10) than the first card (20). In other words, the protective case (10) according to an embodiment of the present invention may be configured such that the first card storage (100) for storing the first card (20) is provided higher than the second card storage (200) for storing the second card (30) by a predetermined height.

In other words, assuming that the first card (20) and the second card (30) have the same size and shape, most of the second card (30) stored in the second card storage (200) is covered from the outer side by the first card stored in the first card storage (100), except the lower part of the second card (30). Accordingly, at least part of the lower part of the second card (30) may be visually exposed to the outside.

The protective case (10) according to an embodiment of the present invention is configured such that at least part of the lower part of the second card (30), which is stored more inner side than the first card (20), is exposed. Thus, a user can easily and visually notice the second card (30), which is stored more inner side than the first card (20), and conveniently take the second card (30) out of the second card storage (200).

Figure 3:
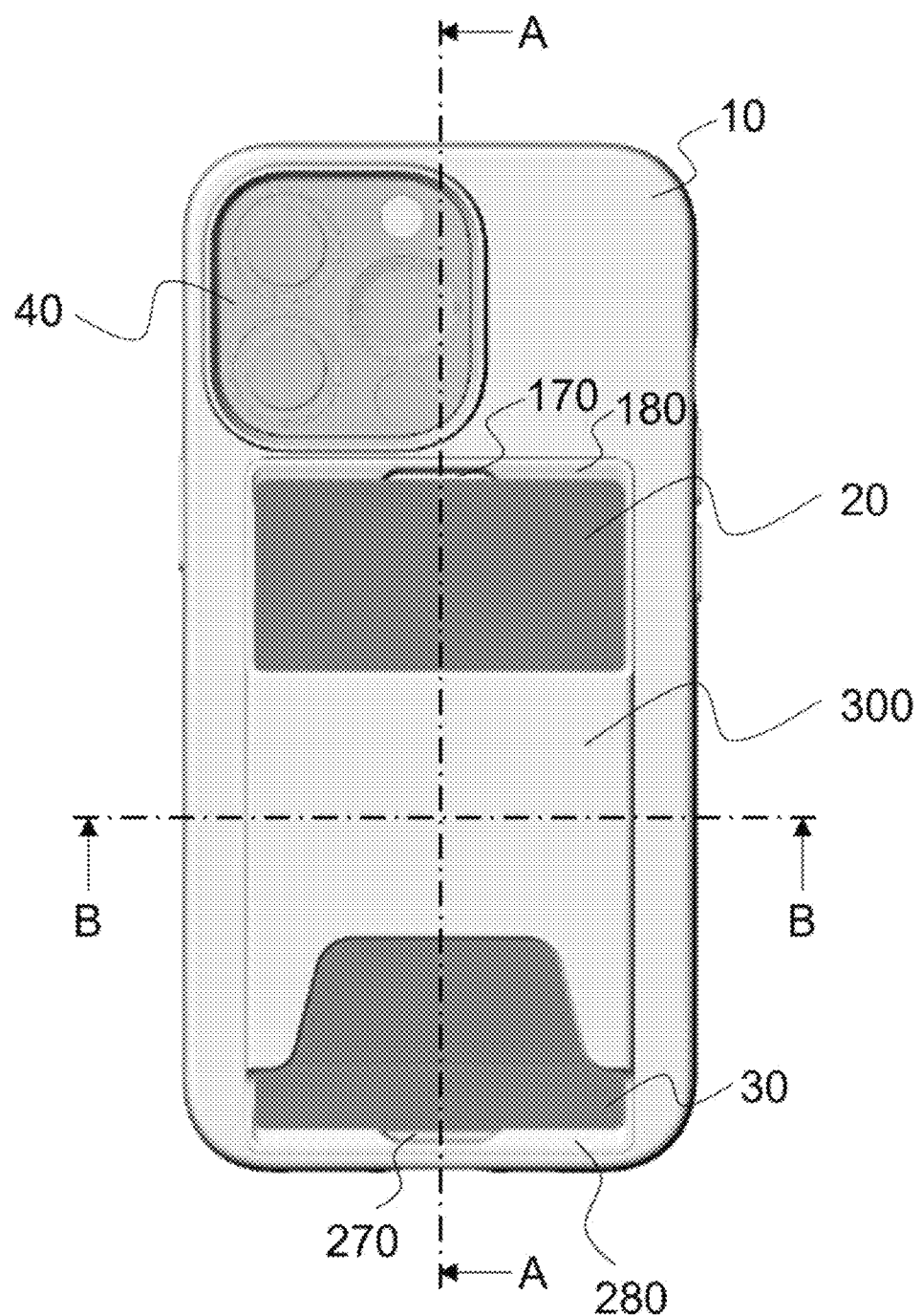
FIG. 3 shows a rear view of the protective case (10) with the first card (20) and the second card (30) stored therein to explain the back of the protective case (10) according to an embodiment of the present invention.

FIG. 3 is a rear view of the protective case (10) with the first card (20) and the second card (30) stored therein to explain the back of the protective case (10) according to an embodiment of the present invention.

Figure 4:
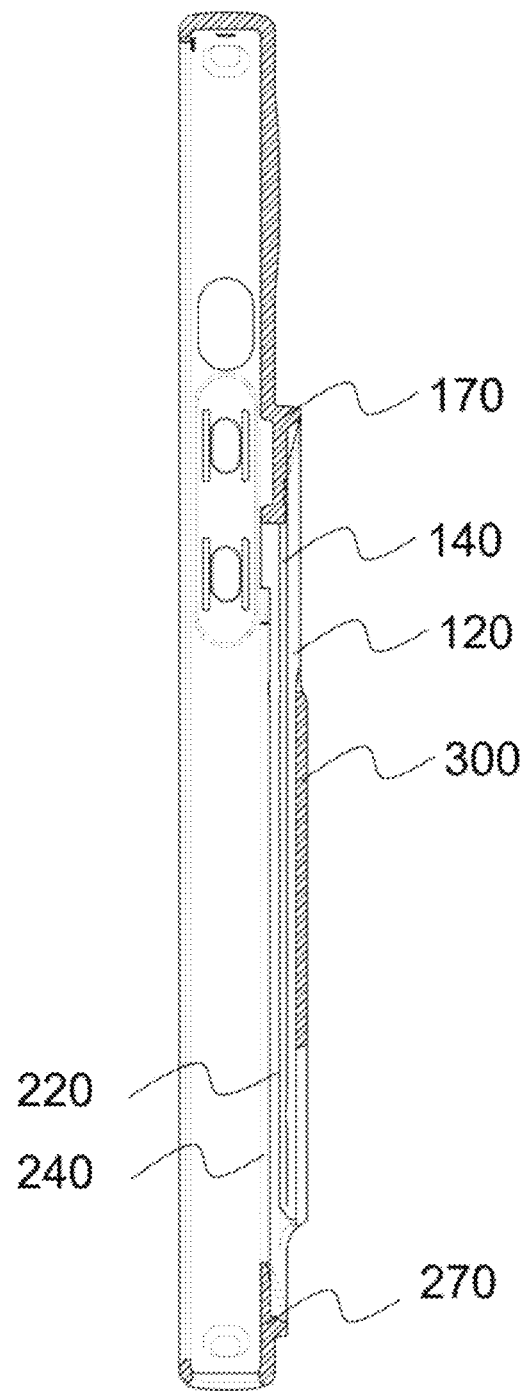
FIG. 4 shows a cross-sectional view A-A of FIG. 3 to explain the protective case (10) according to an embodiment of the present invention.
Figure 5A:
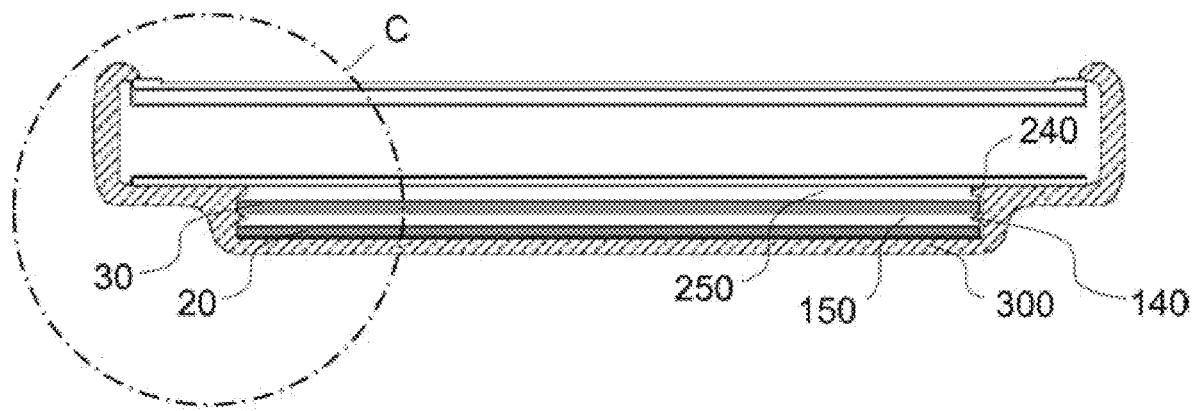
FIG. 5A shows a cross-sectional view B-B of FIG. 3 to explain the protective case (10) according to an embodiment of the present invention.
Figure 5B:
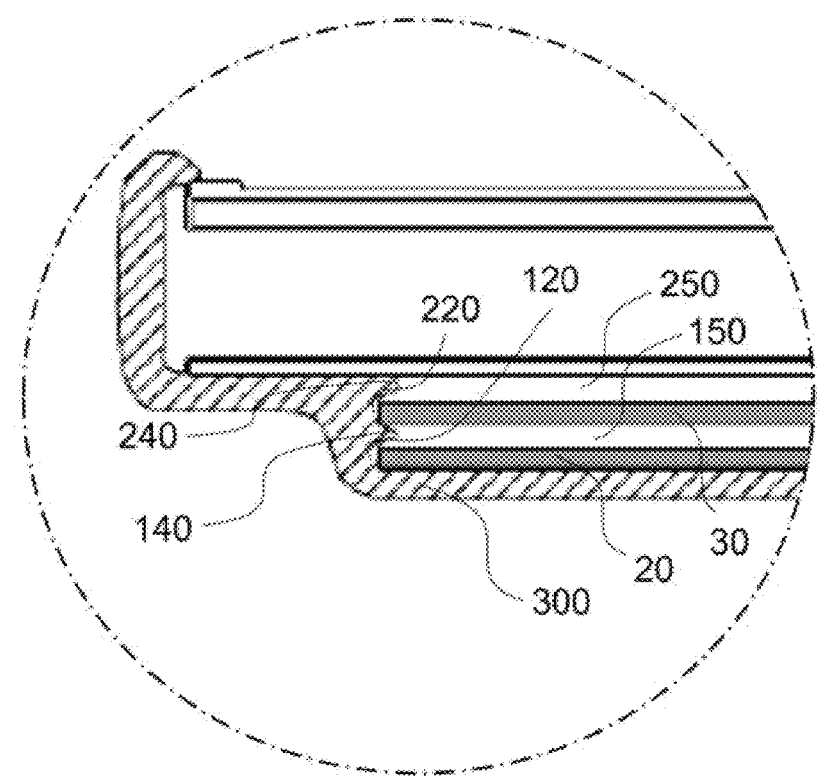
FIG. 5B shows an enlarged view of area C in FIG. 5A according to an embodiment of the present invention.

In addition, FIG. 4 shows a cross-sectional view A-A of FIG. 3 to explain the protective case (10) according to an embodiment of the present invention. FIG. 5A shows a cross-sectional view B-B of FIG. 3 to explain the protective case (10) according to an embodiment of the present invention, and FIG. 5B shows an enlarged view of area C in FIG. 5A according to an embodiment of the present invention.

As shown in FIG. 3, the first card storage (100) according to an embodiment of the present invention may include a first recess (170) formed on one side, namely, a top side, of the first card storage 100 where the first recess (170) is depressed in the top side direction and the inner side direction. In addition, the first card storage (100) according to an embodiment of the present invention may include a first slope (180) provided on both sides of the first recess (170) to form a slanted surface, which is slanted upwardly toward the top side and the outer side.

Likewise, the second card storage (200) according to an embodiment of the present invention may include a second recess (270) formed on the other side, namely, a bottom side, of the second card storage (200) where the second recess (270) is depressed in the bottom side direction and the inner side direction. In addition, the second card storage (200) according to an embodiment of the present invention may include a second slope (280) provided on both sides of the second recess (270) to form a slanted surface, which is slanted upwardly toward the bottom side and the outer side.

Accordingly, the user can easily grab the first card (20) by inserting his fingernail or the like behind the top of the first card (20) through the first recess (170), and then upwardly take the first card (20) out. In addition, the user can easily grab the second card (30) by inserting his fingernail or the like behind the bottom of the second card (30) through the second recess (270), and then downwardly take the second card (30) out.

As shown FIGS. 4, 5A and 5B, the first card storage (100) according to an embodiment of the present invention may include a first storage slide groove (120) configured for the first card (20) to slide along and couple to the first storage slide groove (120). In addition, the second card storage (200) according to an embodiment of the present invention may include the second storage slide groove (220), which is provided near the first storage slide groove (120) and configured for the second card (30) to slide along and couple to the second storage slide groove (220).

The first storage slide groove (120) according to an embodiment of the present invention may be provided on both sides of the first card storage area, namely, one for the right side and the other for the left side of the first card storage area, by being recessed toward the sides by a predetermined depth. In addition, the first storage slide groove (120) according to an embodiment of the present invention may have a depth corresponding to the thickness of the first card (20).

In addition, the first storage slide groove (120) according to an embodiment of the present invention may be formed between both side ends of the inner surface of the card cover (300) and the first spacer protrusion (140). Accordingly, the first card (20) may slide along the first storage slide groove (120) provided between the both side ends of the inner surface of the card cover (300) and the first spacer protrusion (140), and then, couple to the first storage slide groove (120) to be stored in the first card storage (100).

Similarly, the second storage slide groove (220) according to an embodiment of the present invention may be provided on both sides of the second card storage area, namely, one for the left side and the other for the right side of the second card storage area, by being recessed toward the sides by a predetermined depth. In addition, the second storage slide groove (220) according to an embodiment of the present invention may have a depth corresponding to the thickness of the second card (30).

In addition, the second storage slide groove (220) according to an embodiment of the present invention is provided near the first storage slide groove (120) and more specifically, spaced apart from the first storage slide groove (120) to be disposed at more inner side than the first storage slide groove (120). Accordingly, the second card (30) can be stored at more inner side of the protective case (10) than the first card (20).

In addition, the second storage slide groove (220) according to an embodiment of the present invention may be formed between the first spacer protrusion (140) and the second spacer protrusion (240). Accordingly, the second card (30) may slide along the second storage slide groove (220) provided between the first spacer protrusion (140) and the second spacer protrusion (240), and then, couple to the second storage slide groove (220) to be stored in the second card storage (200).

According to an embodiment of the present invention, the first card storage (100) may include a first spacer protrusion (140) provided between the first storage slide groove (120) and the second storage slide groove (220) to form a card separating space (150).

As shown in FIG. 5A, the first spacer protrusion (140) according to an embodiment of the present invention may be provided at both side ends of the card storage area, namely, one for the left side and the other for the right side, respectively protruding toward the center by a predetermined length. In addition, the first spacer protrusion (140) according to an embodiment of the present invention may taper toward an end to form a pointed shape.

A first spacer protrusion (140) according to an embodiment of the present invention is provided between the first storage slide groove (120) and the second storage slide groove (220) to form a card separating space (150) between the first card (20) and the second card (30). Thus, the first and second cards (20, 30) are not touched or scraped against each other when inserting or removing the first or second card (20, 30) into or from the first or second card storage (100, 200), thereby preventing damages from friction between the first and second cards (20, 30). In addition, the frictional force when inserting or removing the first and second cards (20, 30) is minimized, and thus, the first and second cards (20, 30) can be conveniently inserted into or removed from the first and second card storages (100, 200).

According to an embodiment of the present invention, the second card storage portion (200) may include a second spacer protrusion (240) which is provided near or adjacent to the second storage slide groove (220) to form a separating space (250) between the second card (30) and the portable electronic device (40).

More specifically, the second spacer protrusion (240) according to an embodiment of the present invention may be provided at more inner side than the second storage slide groove (220) and at both side ends of the card receiving area, namely, one for the left side and the other for the right side, respectively protruding toward the center by a predetermined length.

A second spacer protrusion (240) according to an embodiment of the present invention is provided at more inner side than the second storage slide groove (220) to form a separating space (250) between the second card (30) and the rear surface of the portable electronic device (40) which are received in the protective case (10). Thus, the second card (30) is not touched or scraped against the rear surface of the portable electronic device (40) when inserting or removing the second card (30) into or from the second card storage (200), thereby preventing damages from friction between the second card (30) and the rear surface of the portable electronic device (40). In addition, the frictional force when inserting or removing the second card (30) is minimized, and thus, the second card (30) can be conveniently inserted into or removed from the second card storage (200).

As shown in FIG. 5B, the first and second storage slide grooves (120, 220) according to an embodiment of the present invention are provided on an inner side of the protective case (10) where a card storage space is formed by the card cover (300). In addition, according to an embodiment of the present invention, the first storage slide groove (120), the first spacer protrusion (140), the second storage slide groove (220), and the second spacer protrusion (240) are provided in order from the back side of the protective case (10) to the inner side of the protective case (10), namely, from the bottom to the top direction in FIG. 5B.

Figure 6:
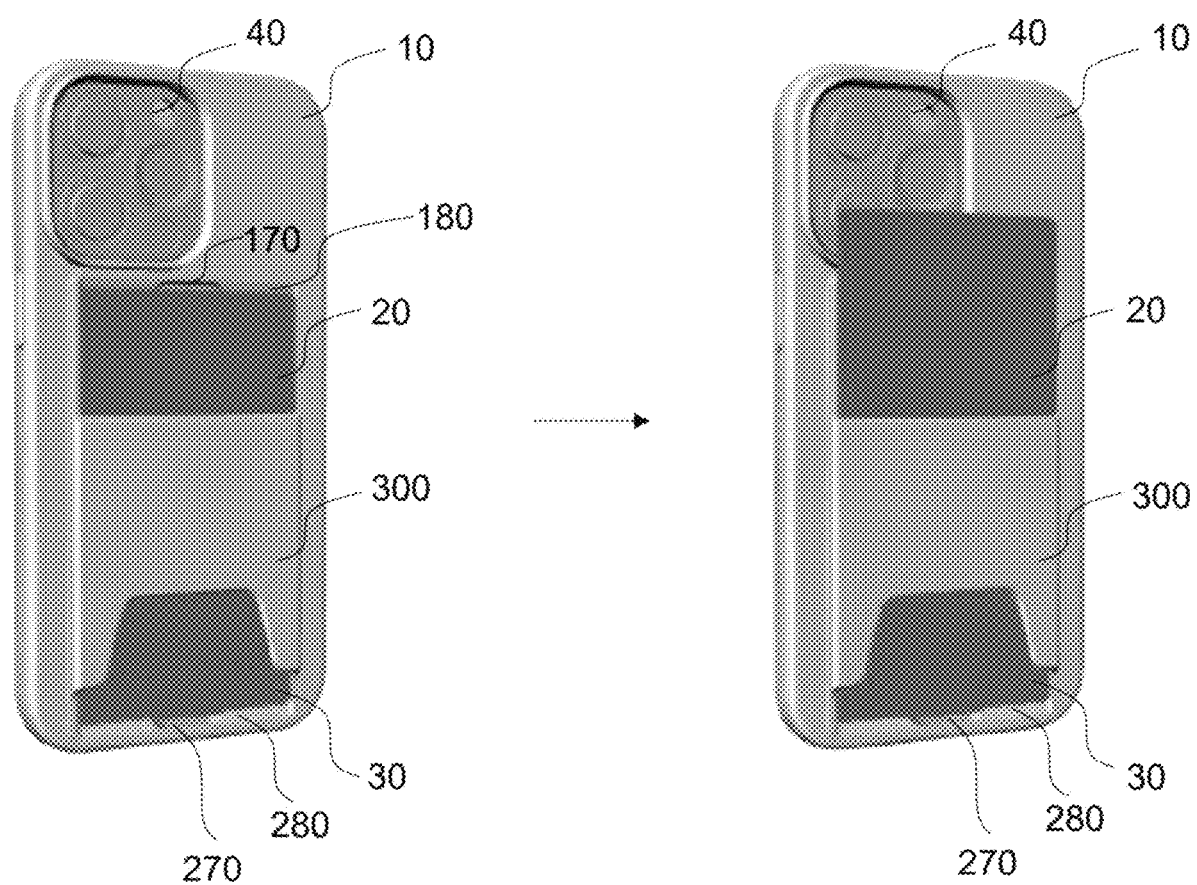
FIG. 6 shows exemplary views to illustrate taking out the first card (20) stored in the protective case (10) according to an embodiment of the present invention.

FIG. 6 shows exemplary views to illustrate taking out the first card (20) stored in the protective case (10) according to an embodiment of the present invention.

As shown in FIG. 6, according to the embodiment of the present invention, when removing the first card (20) stored in the first card storage (100) of the protective case (10), the user can insert his fingernail or the like through the first recess (170) and upwardly take the first card (20) out of the protective case (10).

In other words, when moving the first card (20) slidably coupled to the first storage slide groove (120) which is comprised of a pair of grooves respectively provided at both ends of the first card storage area, the first card (20) upwardly slides along the first storage slide groove (120), is guided upwardly along the first slope (180), and then, is taken out of the protective case (10) through the first opening (110).

Figure 7:
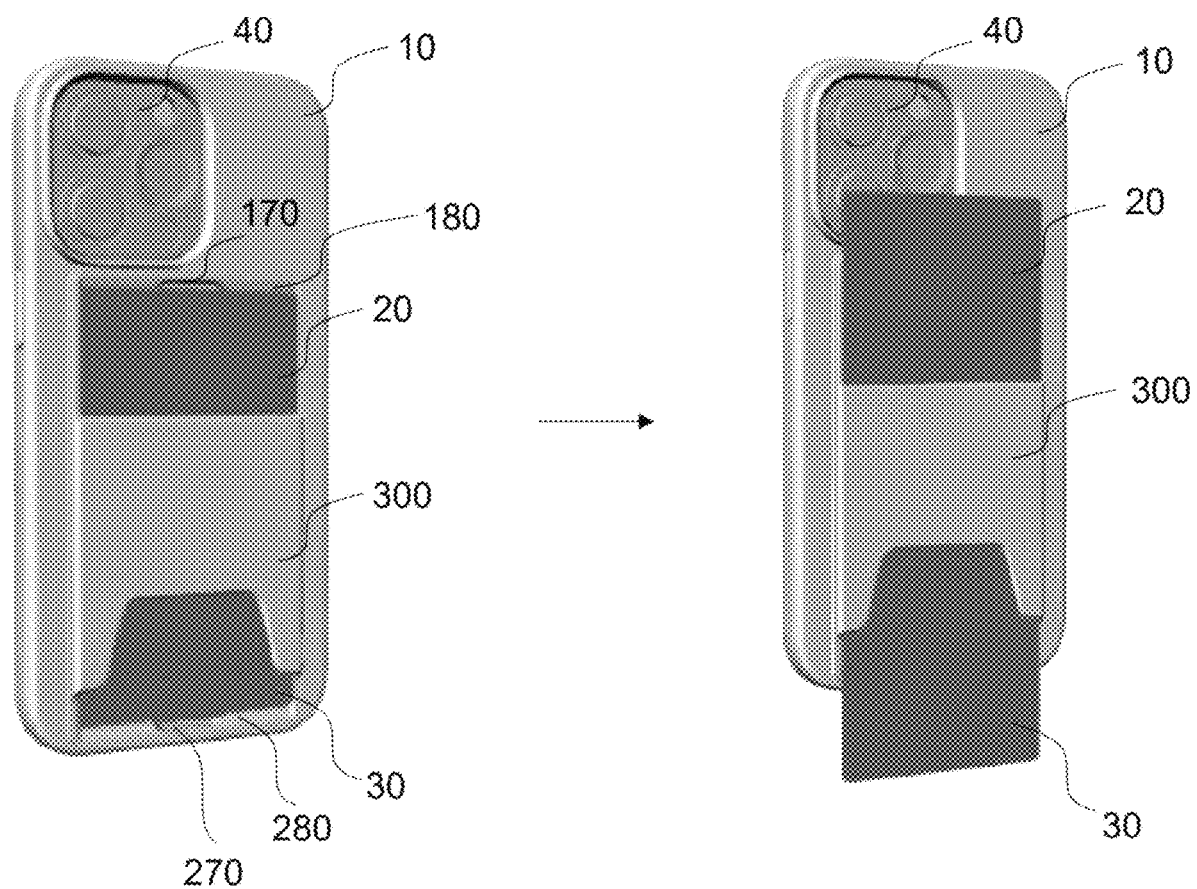
FIG. 7 shows exemplary views to illustrate taking out the second card (30) stored in the protective case (10) according to an embodiment of the present invention.

FIG. 7 shows exemplary views to illustrate taking out the second card (30) stored in the protective case (10) according to an embodiment of the present invention.

As shown in FIG. 7, according to the embodiment of the present invention, when removing the second card (30) stored in the second card storage (200) of the protective case (10), the user can insert his fingernail or the like through the second recess (270) and downwardly take the second card (30) out of the protective case (10).

In other words, when moving the second card (30) slidably coupled to the second storage slide groove (220) which is comprised of a pair of grooves respectively provided at both ends of the second card storage area, the second card (30) downwardly slides along the second storage slide groove (220), is guided downwardly along the second slope (280), and then, is taken out of the protective case (10) through the second opening (210).

According to an additional embodiment of the present invention, in the protective case (10), when the second card (30) is removed from the second card storage (200), the second card (30) may be allowed to be downwardly moved and taken out of the protective case (10) after the first card (20) is upwardly moved by a predetermined distance in the first card storage (100).

In other words, since at least part of the second card (30) is covered by at least part of the lower part of the first card (20) from the outer side, upwardly moving the first card (20) by the predetermined distance can minimize the covered area of the second card (30) by the first card (20), and thus, the second card (30) can be conveniently moved downward and taken out of the protective case (10).

Figure 8:
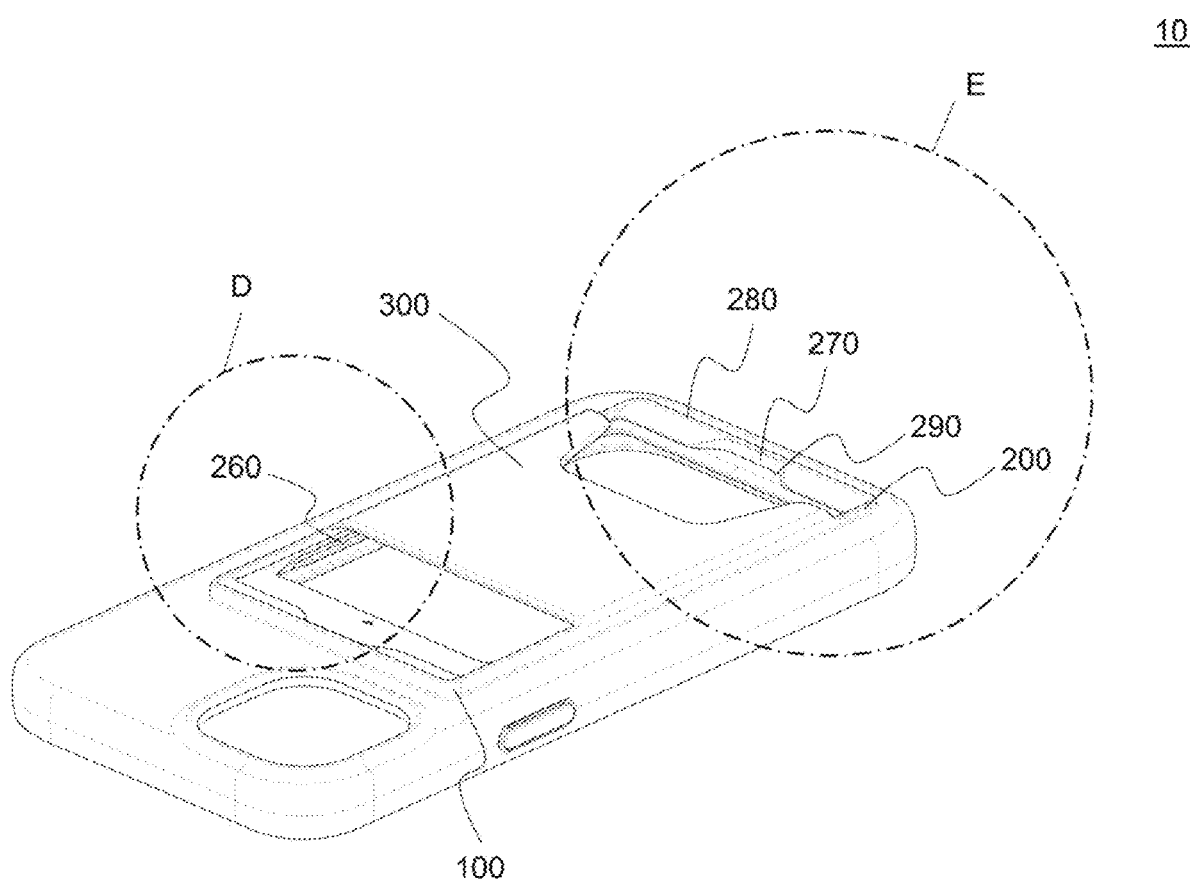
FIG. 8 shows a perspective view of the protective case (10) to explain the detailed configuration of the protective case (10) according to an embodiment of the present invention.

FIG. 8 shows a perspective view of the protective case (10) to explain the detailed configuration of the protective case (10) according to an embodiment of the present invention.

Figure 9:
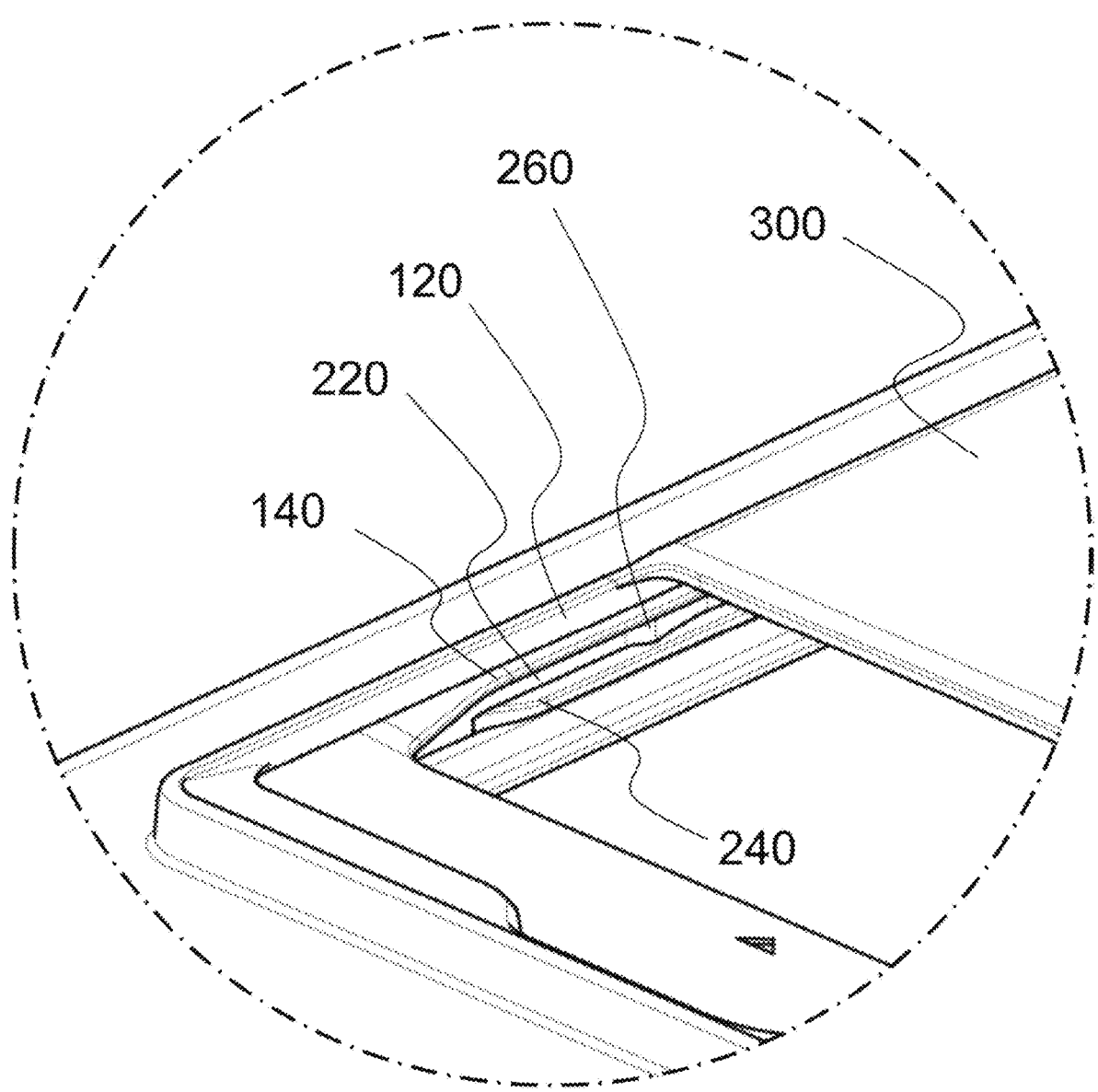
FIG. 9 shows an enlarged view of area D in FIG. 8 according to an embodiment of the present invention.
Figure 10:
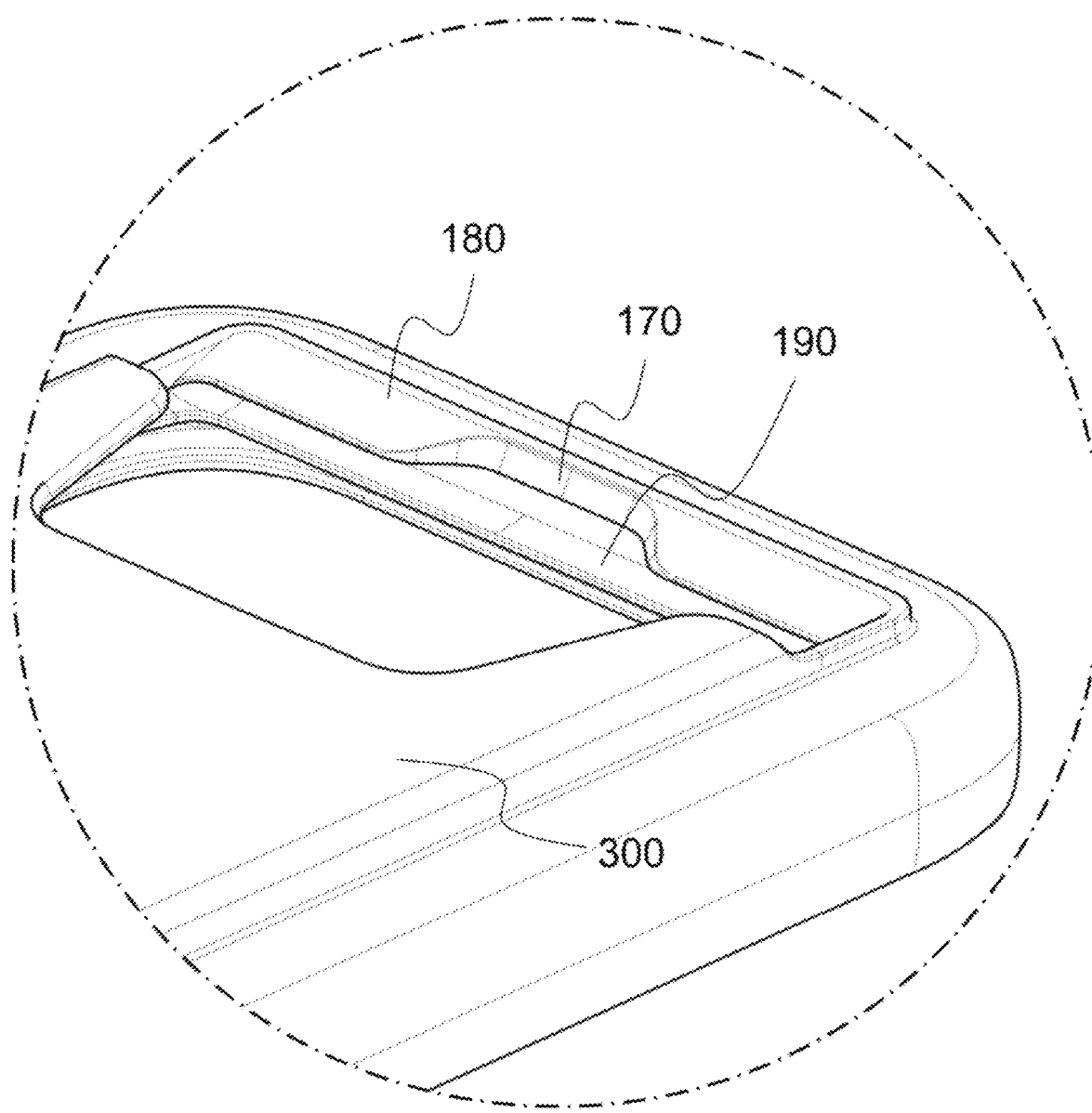
FIG. 10 shows an enlarged view of area E in FIG. 8 according to an embodiment of the present invention.

In addition, FIG. 9 shows an enlarged view of area D in FIG. 8 according to an embodiment of the present invention, and FIG. 10 shows an enlarged view of area E in FIG. 8 according to an embodiment of the present invention.

As shown in FIG. 8, the protective case (10) according to an embodiment of the present invention may include the first opening (110), formed on the upper part of the back of the protective case (10), and the second opening (210), formed on the lower part of the back of the protective case (10), where the first card (20) is inserted and removed through the first opening (110) and the second card (30) is inserted and removed through the second opening (210).

According to an embodiment of the present invention, the second card storage (200) may include a second holding tab (260) which is configured to prevent the stored second card (30) from being dislodged to the outside.

As shown in FIG. 9, the second holding tab (260) according to an embodiment of the present invention is provided on at least part of the second storage slide groove (220) and configured to protrude by a predetermined distance toward the center. In addition, the second holding tab (260) according to an embodiment of the present invention may be configured to be curved to protrude in the center direction. According to an embodiment of the present invention, there may be a total of two second holding tabs (260), namely, a pair of the second holding tabs (260) provided on the left side and the right side, which correspond to a pair of the second storage slide grooves (220) provided on the left side and the right side.

Preferably, the second holding tab (260) according to an embodiment of the present invention may be provided on at least part of the upper part (left side in FIG. 8) of the second storage slide groove (220). In other words, the second holding tab (260) according to an embodiment of the present invention may be provided near the first opening (110).

However, such a configuration that the second holding tab (260) according to an embodiment of the present invention is provided on at least part of the upper part of the second storage slide groove (220) is only an example for better understanding of the present invention. The present invention is not limited to the configuration, but includes other configurations that the second holding tab (260) is provided on the middle part or lower part of the second storage slide groove (220), in addition to the upper part.

The second holding tab (260) according to an embodiment of the present invention is provided on at least part of the second storage slide groove (220) to protrude toward the center, and thus, the second card (30) slidably coupled to the second storage slide groove (220) is tightly retained by the second holding tab (260) and prevented from being dislodged to the outside through the second opening (210).

Similarly, the first card storage (100) according to an embodiment of the present invention may include a first holding tab (160) which is configured to prevent the stored first card (20) from being dislodged to the outside.

Figure 11:
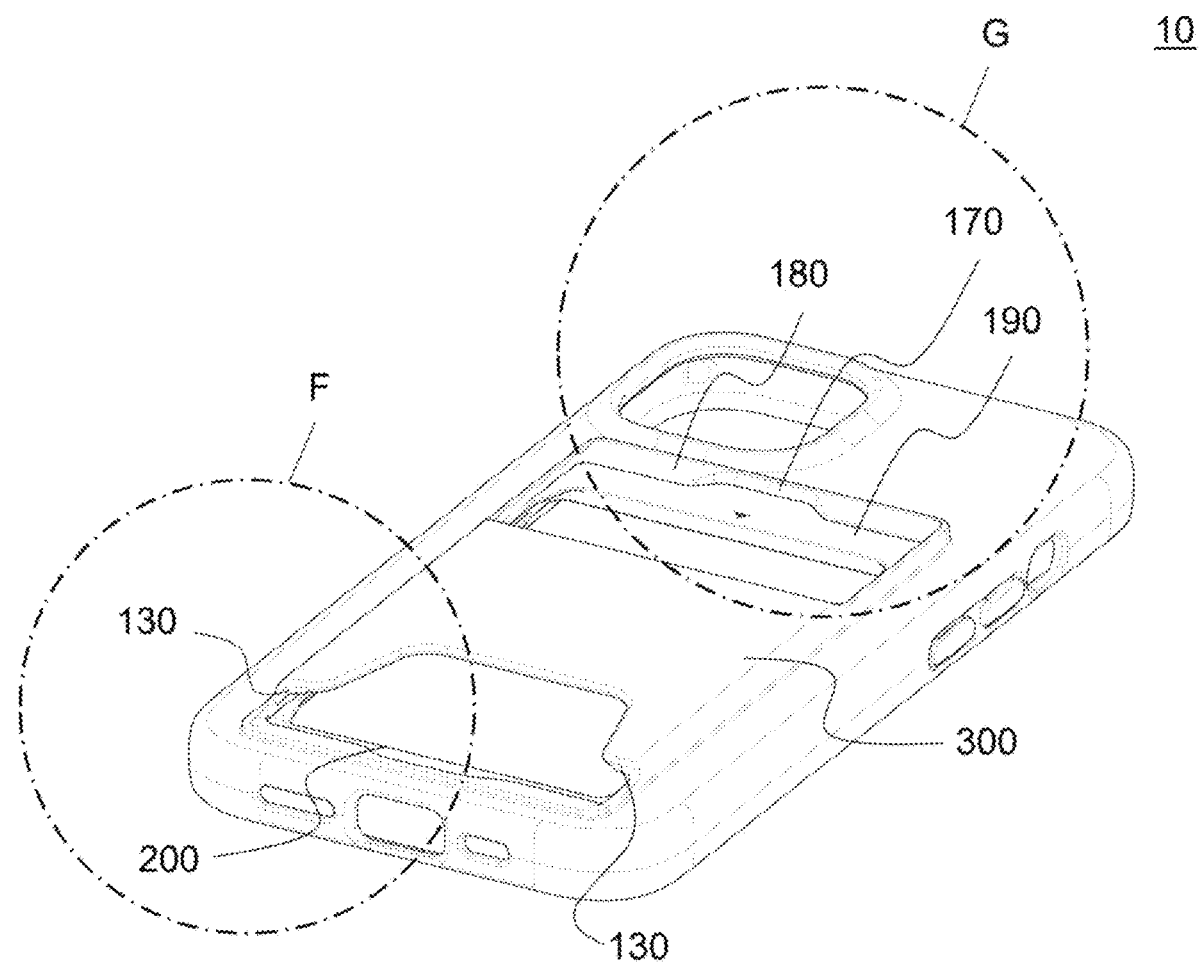
FIG. 11 shows a perspective view of the protective case (10) to explain the detailed configuration of the protective case (10) according to an embodiment of the present invention.
Figure 12:
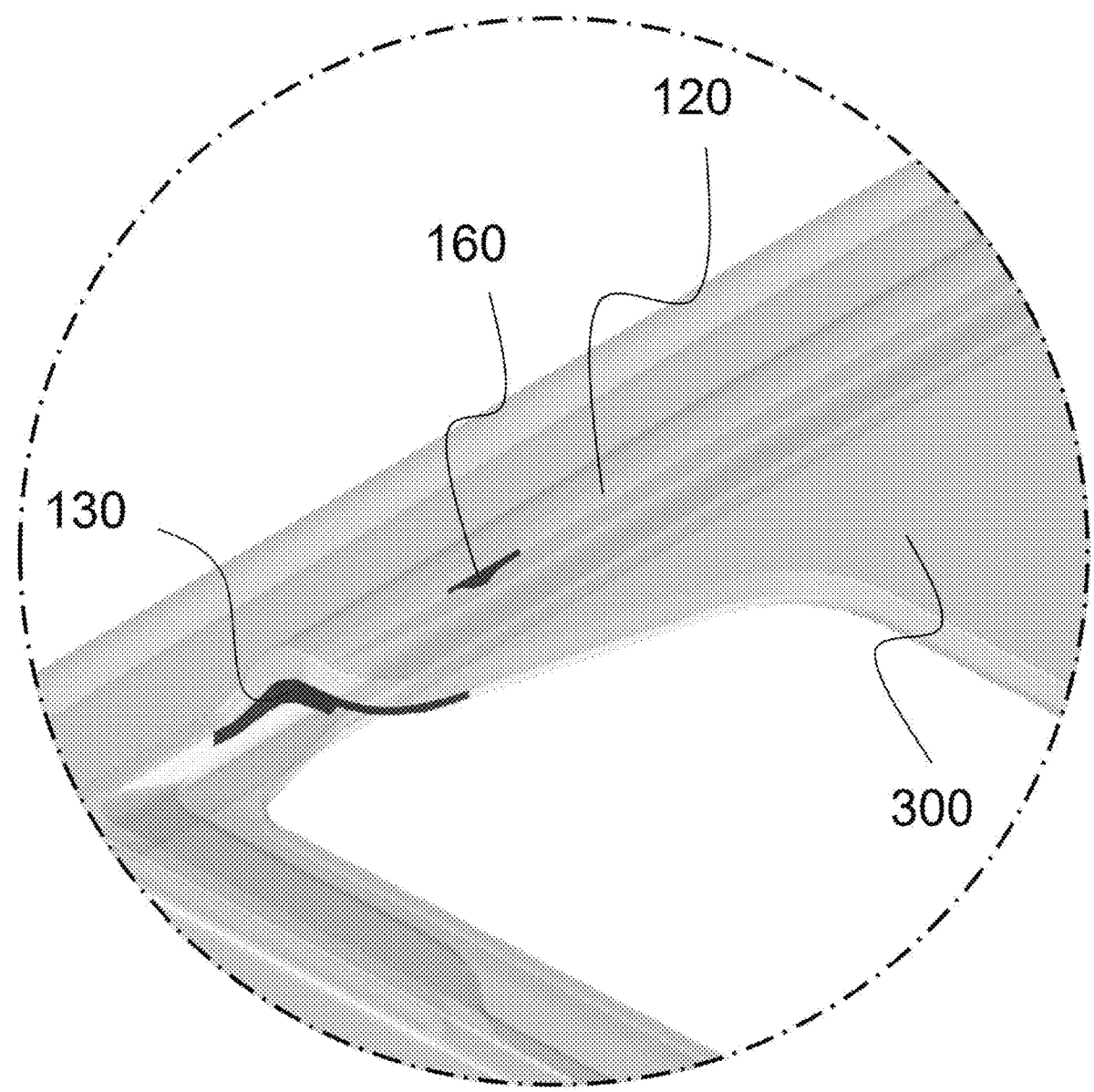
FIG. 12 shows an enlarged view of area F in FIG. 11 according to an embodiment of the present invention.

Referring to FIGS. 11 and 12, the first holding tab (160) according to an embodiment of the present invention is provided on at least part of the first storage slide groove (120) and configured to protrude by a predetermined distance toward the center. In addition, the first holding tab (160) according to an embodiment of the present invention may be configured to be curved to protrude in the center direction. According to an embodiment of the present invention, there may be a total of two first holding tabs (160), namely, a pair of the first holding tabs (160) provided on the left side and the right side, which correspond to a pair of the first storage slide grooves (120) provided on the left side and the right side.

Preferably, the first holding tab (160) according to an embodiment of the present invention may be provided on at least part of the lower part (left and lower side in FIG. 11) of the first storage slide groove (120). In other words, the first holding tab (160) according to an embodiment of the present invention may be provided near the second opening (210) and covered by the card cover (300).

The first holding tab (160) according to an embodiment of the present invention is provided on at least part of the first storage slide groove (120) to protrude toward the center, and thus, the first card (20) slidably coupled to the first storage slide groove (120) is tightly retained by the first holding tab (160) and prevented from being dislodged to the outside through the first opening (110).

Referring to FIGS. 8 and 10, according to an embodiment of the present invention, the second card storage (200) may include a second recess (270) provided on one side of the second card storage (200) and configured to be depressed in the direction of the one side of the second card storage (200).

More specifically, the second recess (270) according to an embodiment of the present invention may be provided at the central part of the lower end of the second card storage (200), namely, at least part of the center of the lower end of the back of the protective case (10), the lower end forming the second opening (210) together with the card cover (300).

The second recess (270) may be depressed in the bottom side direction and the inner side direction. In addition, the second recess (270) according to an embodiment of the present invention may be formed to depress in the bottom side direction and the inner side direction the area between the second slopes (280) provided on both sides of the second recess (270).

Accordingly, the user can easily insert his fingernail or the like between one surface of the second recess (270) and the second card (30) through the second recess (270) and downwardly take out the second card (30).

Similarly, as described above, the first card storage (100) according to an embodiment of the present invention may include a first recess (170) provided on one side of the first card storage (100) and configured to be depressed in the direction of the one side of the first card storage (100).

Figure 13:
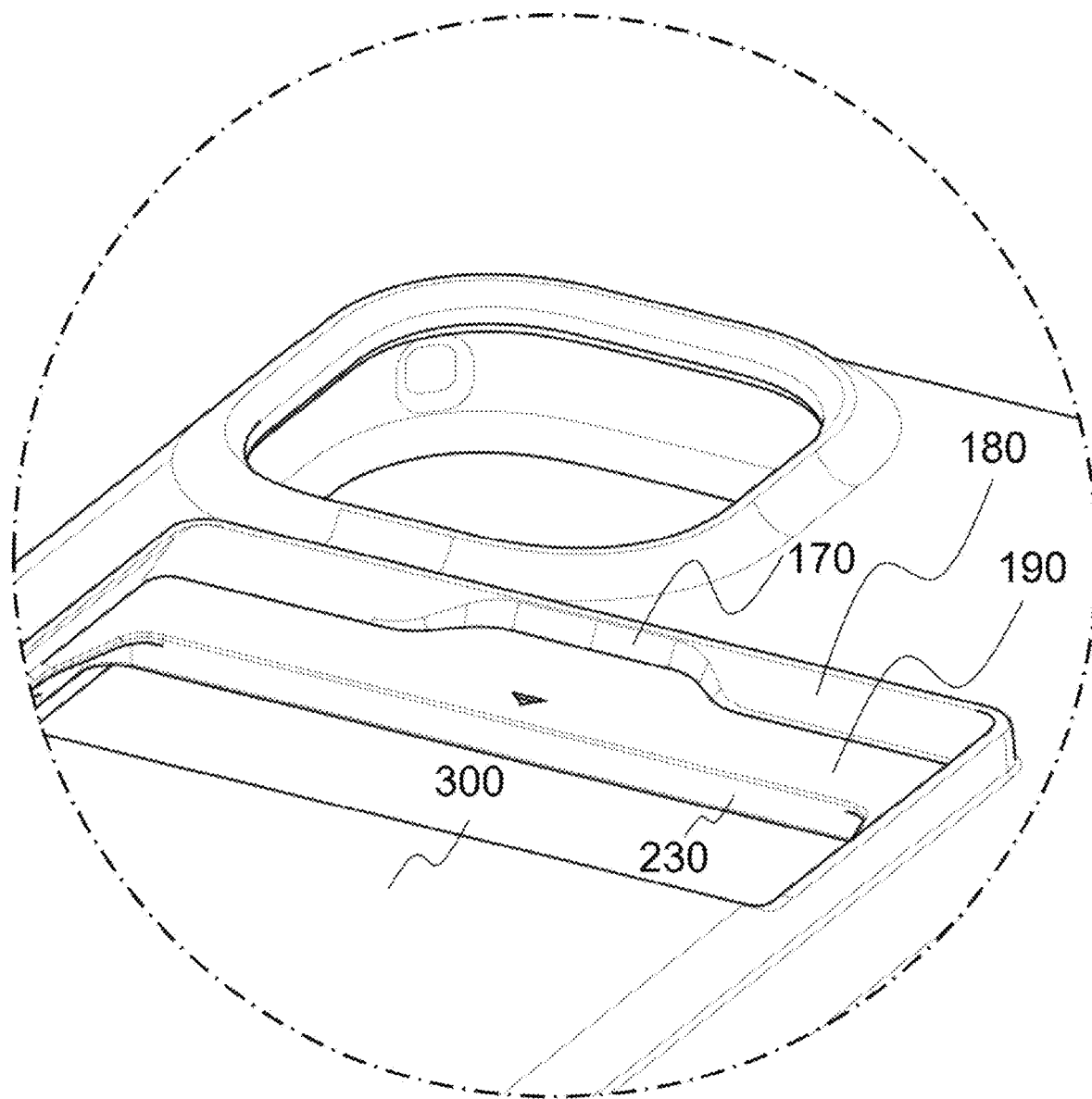
FIG. 13 shows an enlarged view of area G in FIG. 11 according to an embodiment of the present invention.

Referring to FIGS. 11 and 13, the first recess (170) according to an embodiment of the present invention may be provided at the central part of the upper end of the first card storage (100), namely, at least part of the center of the upper part of the back of the protective case (10), the upper part forming the first opening (110) together with the card cover (300). The first recess (170) may be depressed in the top side direction and the inner side direction. In addition, the first recess (170) according to an embodiment of the present invention may be formed by depressing, in the top side direction and the inner side direction, the area between the first slopes (180) provided on both sides of the first recess (170).

Accordingly, the user can easily insert his fingernail or the like between one surface of the first recess (170) and the first card (20) through the first recess (170) and upwardly take out the first card (20).

According to an embodiment of the present invention, the second card storage (200) may include a second slope (280) provided on both sides of the second recess (270) to form a slope. In addition, the second card storage (200) according to an embodiment of the present invention may include a second bottom surface (290) configured to support the second recess (270) and the second slope (280) and form a slanted surface which is connected to the second slope (280).

Referring to FIGS. 8 and 10, the second slope (280) according to an embodiment of the present invention may be provided on the lower end of the second opening (210), through which the second card (30) is removed, to form a slanted surface which is slanted upwardly toward the lower end and the outer side. In addition, the second slope (280) according to an embodiment of the present invention may be provided on both sides of the second recess (270) provided at the lower central area.

In addition, the second bottom surface (290) according to an embodiment of the present invention may be provided on the upper side (the left side and the lower side in FIG. 10) of the second slope (280) and the inner side of the second recess (270) to support the second recess (270) and the second slope (280) and form a slanted surface which is slanted downwardly and outwardly and connected to the second slope (280).

Since the second slope (280) and the second bottom surface (290) according to an embodiment of the present invention form a slanted surface at the lower end of the second opening (210), the second card (30) is sequentially guided downwardly along the second bottom surface (290) and then along the second slope (280) to be taken out of the protective case (10) through the second opening (210) when the second card (30) is to be downwardly taken out through the second opening (210).

Similarly, according to an embodiment of the present invention, the first card storage (100) may include a first slope (180) provided on both sides of the first recess (170) to form a slope. In addition, the first card storage (100) according to an embodiment of the present invention may include a first bottom surface (190) configured to support the first recess (170) and the first slope (180) and form a slanted surface which is connected to the first slope (180).

Referring to FIGS. 11 and 13, the first slope (180) according to an embodiment of the present invention may be provided on the upper end of the first opening (110), through which the first card (20) is removed, to form a slanted surface which is slanted upwardly toward the upper end and the outer side. In addition, the first slope (180) according to an embodiment of the present invention may be provided on both sides of the first recess (170) provided at the upper central area.

In addition, the first bottom surface (190) according to an embodiment of the present invention may be provided on the lower side (the left side and the lower side in FIG. 13) of the first slope (280) and the inner side of the first recess (170) to support the first recess (170) and the first slope (180) and form a slanted surface which is slanted upwardly and outwardly and connected to the first slope (180).

Since the first slope (180) and the first bottom surface (190) according to an embodiment of the present invention form a slanted surface at the upper end of the first opening (110), the first card (20) is sequentially guided upwardly along the first bottom surface (190) and then along the first slope (180) to be taken out of the protective case (10) through the first opening (110) when the first card (20) is to be upwardly taken out through the first opening (110).

FIG. 11 shows a perspective view of the protective case (10) to explain the detailed configuration of the protective case (10) according to an embodiment of the present invention.

FIG. 12 shows an enlarged view of area F in FIG. 11 according to an embodiment of the present invention, and FIG. 13 shows an enlarged view of area G in FIG. 11 according to an embodiment of the present invention.

According to an embodiment of the present invention, the first card storage (100) may include a first stopper (130) configured to prop the first card (20) stored in the first card storage (100).

Referring to FIGS. 11 and 12, the first stopper (130) according to an embodiment of the present invention may be configured to prop the stored first card (20) from the bottom. More specifically, the first stopper (130) according to an embodiment of the present invention is provided on at least part of the lower ends of both sides of the card cover (300) and may be formed to protrude inwardly by a predetermined length.

The card cover (300) according to an embodiment of the present invention may be formed to outwardly (upward in FIG. 12) protrude by a predetermined height from the rear surface of the protective case (10) in order to form the card receiving area. In addition, both sides of the card cover (300) and the area where both sides of the card cover (300) and the rear surface of the protective case (10) meet may be formed to be curved outwardly and toward the center.

The first stopper (130) according to an embodiment of the present invention may protrude inwardly by a predetermined length from the area where the lower ends of both sides of the card cover (300) and the rear surface of the protective case (10) are connected. The first stopper (130) is configured to block the lower end of the first storage slide groove (120) from the lower side, and thus the first stopper (130) can prop the first card (20) slidably coupled to the first storage slide groove (120) from the lower side.

Similarly, according to an embodiment of the present invention, the first card storage (200) may include a second stopper (230) configured to prop the second card (30) stored in the second card storage (200).

Referring to FIGS. 11 and 13, the second stopper (230) according to an embodiment of the present invention may be configured to support the stored second card (30) from the top. More specifically, the second stopper (230) according to an embodiment of the present invention is provided as the lower surface of the first bottom surface (190) to block the upper end of the second storage slide groove (220) from the upper side. Accordingly, the second stopper (230) can support the second card (30) slidably coupled to the second storage slide groove (220) from the upper side.

Since the first and second stoppers (130, 230) according to an embodiment of the present invention are provided, the first and second cards (20, 30) slidably coupled to the first and second storage slide grooves (120, 220) respectively can be securely retained and supported in the first and second card storages (100, 200) without being dislodged from the card storage area. Particularly, the first stopper (130) can prevent the first card (20) from sliding up to the second recess (270), and thus it allows at least part of the second card (30), stored at more inner side, to be visually exposed, thereby facilitating easy removal of the second card (30).

In the protective case (10) according to a further embodiment of the present invention, at least part of the card cover (300) may be made of a material (for example, ferrite material, etc.) to increase the wireless charging efficiency of the portable electronic device (40). In addition, in the protective case (10) according to an additional embodiment of the present invention, at least part of the card cover (300) may be made of a heat dissipation material capable of reducing heat generation during the wireless charging.

In addition, according to a further embodiment of the present invention, the protective case (10) may include a card cover (300) to store the first and second cards (20, 30) where the card cover (300) can be detached from the protective case (10) together with the stored first and second cards (20, 30). Thus, for wireless charging or when the cards are not needed, the card cover (300) which stores the first and second cards (20, 30) can be detached from the protective case (10).

As described above, according to the protective case having card storages for portable electronic device according to an embodiment of the present invention, two cards can be separately stored in a double rail structure, and thus, only an intended card can be conveniently taken out.

In addition, according to the protective case having card storages for portable electronic device according to an embodiment of the present invention, two openings are respectively formed on top and bottom of the back of the protective case, and two cards can be conveniently inserted into or removed, and the usability of the card storage has been enhanced.

In addition, according to the protective case having card storages for portable electronic device according to an embodiment of the present invention, a holding tab is formed on the area, where the card is stored, to prevent the card from being dislodged through the opening.

In addition, according to the protective case having card storages for portable electronic device according to an embodiment of the present invention, a recess is formed on the area where the card is removed, and a slope is formed to minimize a bend of the card during the insertion or removal of the card. Thus, the user can easily remove the card from the card storage.

In addition, according to the protective case having card storages for portable electronic device according to an embodiment of the present invention, a stopper capable of securing and supporting the card stored in the protective case is provided, and thus the card can be securely retained in the storage area.

As described above, the optimal embodiments have been disclosed in the drawings and the specification. Although specific terms are used herein, they are used only for the purpose of describing the present invention and are not used to limit the meaning or scope of the present invention described in the claims. Therefore, it will be understood by those skilled in the art that various modifications and equivalent other embodiments are possible therefrom. Accordingly, the true technical protection scope of the present invention should be defined by the technical spirit of the appended claims.

LIST OF REFERENCE CHARACTERS

10: protective case
20: first card
30: second card
40: portable electronic device
100: first card storage
110: first opening
120: first storage slide groove
130: first stopper
140: first spacer protrusion
150: card separating space
160: first holding tab
170: first recess
180: first slope
190: first bottom surface
200: second card storage
210: second opening
220: second storage slide groove
230: second stopper
240: second spacer protrusion
250: separating space between the second card and the portable electronic device
260: second holding tab
270: second recess
280: second slope
290: second bottom surface
300: card cover

What is claimed is:

1. A protective case configured to cover a portable electronic device, the protective case comprising:
   a first card storage configured to store a first card; and
   a second card storage configured to store a second card wherein the second card storage is spaced apart from the first card storage; and
   a card cover configured to at least partially cover the first card storage,
   wherein the first card storage comprises a first storage slide groove and a first spacer protrusion, wherein the first storage slide groove is configured for the first card to slide along and couple to the first storage slide groove, and the first spacer protrusion forms a card separating space between the first and second cards, wherein the first spacer protrusion includes a pair of protruding elements that are disposed at both side ends of a card storage area to face each other at a same level and protrude toward a center of the card storage area by a predetermined length such that the first card slides along the pair of protruding elements of the first spacer protrusion to be stored in the first card storage, wherein the second card storage comprises a second storage slide groove and a second spacer protrusion, wherein the second storage slide groove is provided near the first storage slide groove and configured for the second card to slide along and couple to the second storage slide groove, and the second spacer protrusion, provided near or adjacent to the second storage slide groove, is spaced apart from the first spacer protrusion and forms a space between the second card and the portable electronic device, wherein the second spacer protrusion includes a pair of protruding elements that are disposed at both side ends of the card storage area to face each other at a same level and protrude toward the center of the card storage area by a predetermined length such that the second card slides along the pair of protruding elements of the second spacer protrusion to be stored in the second card storage, wherein the first card storage is formed higher than the second card storage by a predetermined height, and a lower end of the second card, which is retained at a more inner side than the first card, is at least partially exposed when the first and second cards are retained in the first and second card storages, wherein the first card storage includes a first opening formed on at least a part of the first card storage such that the first card is inserted or removed through the first opening, wherein the second card storage includes a second opening formed on at least a part of the second card storage such that the second card is inserted or removed through the second opening, wherein the first opening and the second opening are located on opposite sides of the card cover and connected to each other by a space covered by the card cover to form an integrated single space, and wherein each of the first and second card storages further comprises a recess formed to be depressed on one side thereof that faces the card cover and extends perpendicular to a direction that the respective card slides along, and a slope provided on both sides of the recess and formed by a slanted surface that is inclined toward the card cover in the direction that the respective card slides along.

2. The protective case of claim 1, wherein the first card storage further comprises a first stopper to prop the first card stored in the first card storage.

3. The protective case of claim 1, wherein the first card storage further comprises a first holding tab to prevent the first card stored in the first card storage from being dislodged to an outside.

* * * * *